United States Patent [19]

Iizuka

[11] 4,348,090
[45] Sep. 7, 1982

[54] INVERTED GALILEAN FINDER
[75] Inventor: Yutaka Iizuka, Tokyo, Japan
[73] Assignee: Nippon Kogaku K.K., Tokyo, Japan
[21] Appl. No.: 266,218
[22] Filed: May 22, 1981
[51] Int. Cl.³ .............................................. G03B 13/08
[52] U.S. Cl. ................................................... 354/224
[58] Field of Search ............... 354/219, 224, 195, 225, 354/221, 199, 222; 50/410, 453

[56] References Cited

U.S. PATENT DOCUMENTS 2,206,382 7/1940 Zimmermann ................ 350/453
2,829,560 4/1958 Tackaberry et al. ............ 350/410

FOREIGN PATENT DOCUMENTS 449434 6/1936 United Kingdom ............ 350/453
915118 1/1963 United Kingdom ............ 354/219

Primary Examiner—Donald A. Griffin
Attorney, Agent, or Firm—Fitzpatrick, Cella, Harper & Scinto

[57] ABSTRACT

An inverted Galilean finder has a divergent objective lens and a convergent eyepiece. The objective lens includes, in succession from the object side, a first negative lens and a second negative lens. The eyepiece includes, in succession from the object side, a first positive lens and a second positive lens.

5 Claims, 3 Drawing Figures

INVERTED GALILEAN FINDER

BACKGROUND OF THE INVENTION

1. Field of the Invention

This invention relates to improvements in an inverted Galilean finder, and more particularly to an inverted Galilean finder suitable as an Albada finder.

2. Description of the Prior Art

With the prior art finder of this type, it has often been the case that a finder having a small exit pupil diameter is mounted based on its relations with the mechanism and size of a camera body. In such a finder, the exit pupil diameter is small and therefore, the observing eye must be kept as close to the eyepiece as possible and this has unavoidably led to the cramped sensation in use, and further led to the disadvantage that if the eye is kept away from the eyepiece even a little, the marginal portion of the finder view field indicating the photographing range is changed. Also, if the outside diameter of the prior art finder optical system is simply increased in an effort to increase the exit pupil diameter, blur is created in the finder view field image because the aberration performance in the marginal portion of the exit pupil diameter is not sufficiently corrected, and this has led to the disadvantage that the practical performance cannot be satisfied.

SUMMARY OF THE INVENTION

The present invention has for its object to overcome the above-noted disadvantages and to provide an inverted Galilean finder in which aberrations have been well corrected up to the marginal portion of a large exit pupil diameter.

The invention will become fully apparent from the following detailed description thereof taken in conjunction with the accompanying drawings.

DESCRIPTION OF THE PREFERRED EMBODIMENT

Figure 1:
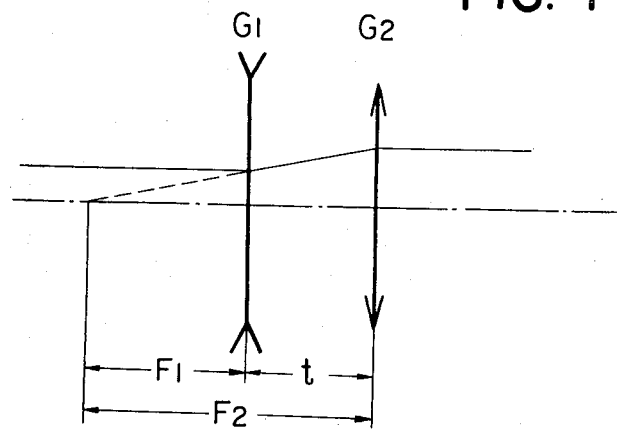
FIG. 1 shows the basic construction of an inverted Galilean finder.

FIG. 1 is a principle diagram showing the basic construction of an ordinary inverted Galilean finder. $F_1$ and $F_2$ are the focal lengths of a divergent objective lens $G_1$ and a convergent eyepiece $G_2$, respectively, and t is the interval between the principal surfaces of these two groups. $F_1$ and $F_2$ constitute an afocal system and when the angular magnification thereof is $\gamma$, $$\begin{cases} \gamma = \dfrac{(-F_1)}{F_2} \\ F_2 = (-F_1) + t \end{cases}$$

Hence, $$\begin{cases} (-F_1) = \dfrac{t}{1-\gamma} \\ F_2 = \dfrac{t}{1-\gamma} \end{cases}$$

Generally, in the design of an inverted Galilean finder, it is often the case that the interval t between the principal surfaces and the angular magnification $\gamma$ are given as specifications, and the focal lengths $F_1$ and $F_2$ of the two lenses are obtained as the functions thereof. In the actual design, however, the interval t between the principal surfaces and the angular magnification $\gamma$ have some degrees of selection ranges from the relation with the mechanism and arrangement of the camera body, and to know this relation, the amounts of variation in $F_1$ and $F_2$ for the amounts of variation in t and $\gamma$ may be sought after as follows:

$$\left(\frac{d(-F_1)}{dt}\right)_{\gamma=const} = \frac{\gamma}{1-\gamma}$$

$$\left(\frac{dF_2}{dt}\right)_{\gamma=const} = \frac{1}{1-\gamma}$$

$$\left(\frac{d(-F_1)}{d\gamma}\right)_{t=const} = \frac{t}{(1-\gamma)^2}$$

$$\left(\frac{dF_2}{d\gamma}\right)_{t=const} = \frac{t}{(1-\gamma)^2}$$

If the angular magnification $\gamma$ becomes small, the outside diameter of the finder system will be made smaller, but the view field image observed within the finder will become too small and the finder will become one in which such image is difficult to see. Conversely, if $\gamma$ becomes great, the view field image will become easy to see, in a finder like the finder of the present invention which has a large exit pupil diameter, the outside diameter will become too great and this is not practical.

Figure 2:
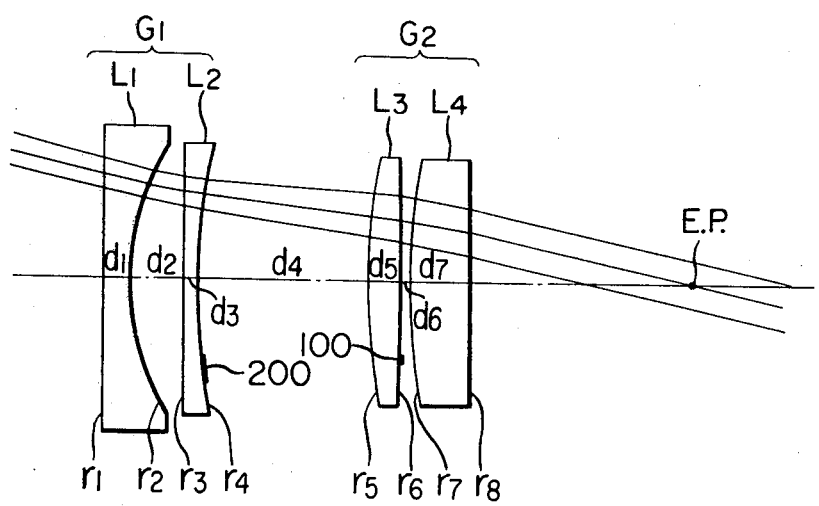
FIG. 2 shows the lens construction according to an embodiment of the present invention.

In the present invention, as the result of consideration having been given to the foregoing points, the divergent objective lens $G_1$ is constituted by first and second negative lenses $L_1$ and $L_2$ and the convergent eyepiece $G_2$ is constituted by first and second positive lenses $L_3$ and $L_4$, as shown in FIG. 2, and the entire system is constructed so as to satisfy the following conditions:

$$1.2|F_1| < |f_1| < 1.4|F_1| \tag{1}$$

$$4.4|F_1| < |f_2| < 5.2|F_1| \tag{2}$$

$$1.8F_2 < f_3 < 2.2F_2 \tag{3}$$

$$1.8F_2 < f_4 < 2.2F_2 \tag{4}$$

where $f_1$ and $f_2$ are the focal lengths of the first and second negative lenses, respectively, and $f_3$ and $f_4$ are the focal lengths of the first and second positive lenses, respectively.

Formulas (1) and (2) prescribe the power allotment of the respective lenses in the objective lens $G_1$, and formulas (3) and (4) prescribe the power distribution in the eyepiece $G_2$. In an objective lens comprising two single negative lenses, it is desirable to allot the power of the entire objective lens to the respective single lenses equally to the utmost for the correction of distortion and coma. However, a surface of the lenses constituting the objective lens which is convex toward the object side is used as the reflecting surface of an Albada finder for reflecting the reflected light rays from a field frame formed on the eyepiece and making such rays into a field frame image. Therefore, it is not possible to allot the power simply equally to the two single negative lenses constituting the objective lens $G_1$, but most of the power of the objective lens is allotted to the first negative lens $L_1$ and a power which will perform the function as an Albada reflecting surface is allotted to the second negative lens $L_2$. In such a power distribution, correction is made so that the erect virtual image of the object formed by the objective lens $G_1$ has a good aberration performance.

If the lower limit of formula (1) is exceeded, the correction of distortion of off-axis rays will become difficult, and if the upper limit of formula (1) is exceeded, the full length of the finder system will become too great. If the lower limit of formula (2) is exceeded, it will be impossible to provide an Albada field frame on the first positive lens $L_3$ and it will become necessary to additionally provide an optical member for the field frame between the first negative lens $L_1$ and the second negative lens $L_2$. If the upper limit of formula (2) is exceeded, it will become necessary to additionally provide an optical member outside of the second positive lens $L_4$ and this will lead to an increased full length. Formulas (3) and (4) prescribe that the power of $f_1$ should be bisected and allotted to the lenses $L_3$ and $L_4$ forming the eyepiece $G_2$. The eyepiece is required to correct off-axis coma well in order to direct the erect virtual image formed by the objective lens to the eye substantially afocally and for this purpose, the power of $f_1$ should preferably be allotted equally as shown by formulas (3) and (4).

Also, in the present invention, it is desirable in order to eliminate the distortion of off-axis rays that the refractive index $N_1$ of the first negative lens $L_1$ be $N_1 > 1.7$, (5) and it is desirable that the shapes of the first and second negative lenses $L_1$ and $L_2$ to determined in the following ranges:

$$-1.1 < \frac{\gamma_2 + \gamma_1}{\gamma_2 - \gamma_1} < -0.9 \quad (6)$$

$$-1.3 < \frac{\gamma_4 + \gamma_3}{\gamma_4 - \gamma_3} < -0.7 \quad (7)$$

where $\gamma_1 - \gamma_4$ represent the curvature radii of the successive surfaces of the first and second negative lenses from the object side. If the lower limit of formula (6) is exceeded, the off-axis light obliquely incident on the first surface of the first negative lens $L_1$ will be sharply refracted to cause creation of negative distortion and also increase creation of lower coma. If the upper limit of formula (6) is exceeded, the curvature of the second surface of the first negative lens $L_1$ will become greater and the distortion of off-axis rays will become excessive to the negative. If the lower limit of formula (7) is exceeded, the coincidence of aberration correction with the shape of bending of each lens forming the eyepiece will become unpreferable and particularly, upper coma will become excessive to the positive. If the upper limit of formula (7) is exceeded, it will become impossible to provide an Albada field frame on the surface of the eyepiece.

Further, in order that off-axis coma may be well corrected around the exit pupil, it is desirable that the shapes of the first positive lens $L_3$ and the second positive lens $L_4$ be determined in the following ranges:

$$0.8 < \frac{\gamma_6 + \gamma_5}{\gamma_6 - \gamma_5} < 1.2 \quad (8)$$

$$0.8 < \frac{\gamma_8 + \gamma_7}{\gamma_8 - \gamma_7} < 1.2 \quad (9)$$

where $\gamma_5 - \gamma_8$ represent the curvature radii of the successive surfaces of the first and second positive lenses from the object side. If the lower limits of formulas (8) and (9) are exceeded, the coincidence of aberration correction with each lens of the objective lens will become unpreferable and therefore, lower coma will become excessive to the positive. If the upper limits of formulas (8) and (9) are exceeded, the eyepiece will be used while being darkened and the stretch of coma will become bad with the coma around the exit pupil becoming excessive and thus, it will be impossible to make the exit pupil large.

Numerical data of an embodiment of the present invention will be shown in the table below. The lens construction is as shown in FIG. 2, wherein as an Albada finder, a field frame 100 for bright frame is provided on the rear surface of the first positive lens $L_3$ by evaporation and a reflecting surface 200 is formed on the rear surface of the second negative lens $L_2$.

TABLE

| | $\gamma$ | d | nd | $\nu$d |
|---|---|---|---|---|
| (1) | ∞. | 2.50000 | 1.71300 | 54.0 |
| (2) | 25.12000 | 4.40000 | | |
| (3) | ∞. | 1.50000 | 1.51680 | 64.1 |
| (4) | 66.57700 | 14.40000 | | |
| (5) | 49.60000 | 2.80000 | 1.51680 | 64.1 |
| (6) | ∞. | .50000 | | |
| (7) | 49.60000 | 5.40000 | 1.51680 | 64.1 |
| (8) | ∞. | | | |

Figure 3:
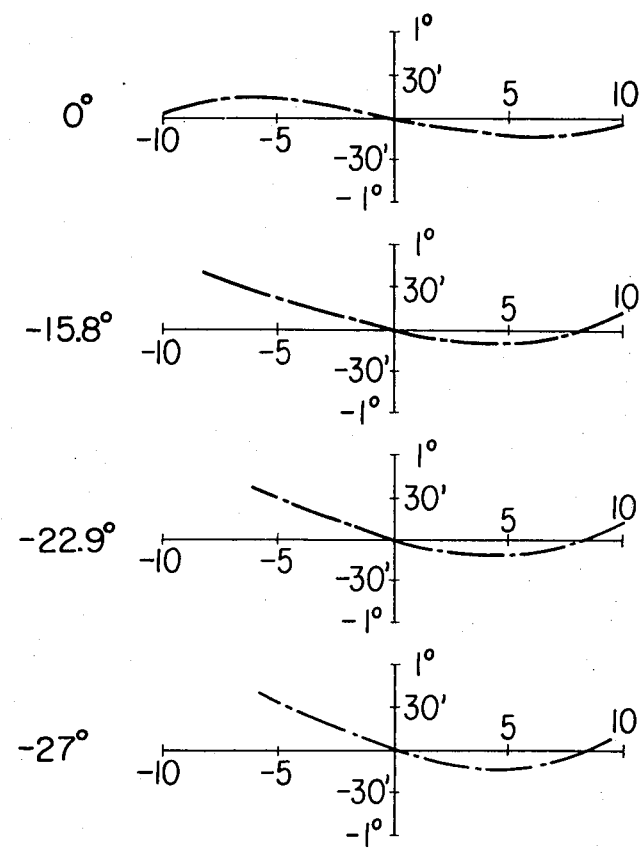
FIG. 3 shows the lateral aberration when the exit pupil position is 20 mm.

($d_4$ is the interval when visibility = −0.931)
$F_1 = -35.231$
$f_2 = -128.825$
$f_3 = 95.975$
$f_4 = 95.975$
$F_1 = -26.786$
$F_2 = 48.581$
$t = 21.795$ (when visibility = 0 Diopter)
$\gamma = 0.551$ The aberrations in the inverted Galilean finder according to the present embodiment are shown in FIG. 3. These aberration graphs are lateral aberration graphs showing how light beams from an object at infinity having the angles of 0°, −15.8°, −22.9° and −27° with respect to the objective lens are at the position of the exit pupil, namely, the eye point (E.P.), and the abscissa thereof represents the radial distance on the exit pupil and the ordinate thereof represent the angle with respect to the principal ray passing through the eye point. These aberration graphs have been calculated with the eye point as a position as distant as 20 mm from the rear surface of the eyepiece. It is seen that the light beam of each angle is corrected with a good balance and has a considerably good performance even in the radius 10 mm of the exit pupil in spite of the distance to the eye point being as long as 20 mm.

I claim:

1. An inverted Galilean finder having a divergent objective lens and a convergent eyepiece, said objective lens including, in succession from the object side, a first negative lens and a second negative lens, said eyepiece including, in succession from the object side, a first positive lens and a second positive lens, said finder satisfying the following conditions:

$$1.2|F_1| < |f_1| < 1.4|F_1|$$

$$4.4|F_1| < |f_2| < 5.2|F_1|$$

$$1.8\, F_2 < f_3 < 2.2\, F_2$$

$$1.8\, F_2 < f_4 < 2.2\, F_2$$

where $F_1$ represents the focal length of said objective lens, $F_2$ the focal length of said eyepiece, $f_1$ the focal length of said first negative lens, $f_2$ the focal length of said second negative lens, $f_3$ the focal length of said first positive lens, and $f_4$ the focal length of said second positive lens.

2. An inverted Galilean finder according to claim 1, wherein the refractive index $N_1$ of said first negative lens is $N_1 > 1.7(5)$ and the shapes of said first negative lens and said second negative lens satisfy the following conditions:

$$-1.1 < \frac{\gamma_2 + \gamma_1}{\gamma_2 - \gamma_1} < -0.9$$

$$-1.3 < \frac{\gamma_4 + \gamma_3}{\gamma_4 - \gamma_3} < -0.7$$

where $\gamma_1$–$\gamma_4$ represent the curvature radii of the successive surfaces of said first and second negative lenses from the object side.

3. An inverted Galilean finder according to claim 2, wherein the shapes of said first positive lens and said second positive lens satisfy the following conditions:

$$0.8 < \frac{\gamma_6 + \gamma_5}{\gamma_6 - \gamma_5} < 1.2$$

$$0.8 < \frac{\gamma_8 + \gamma_7}{\gamma_8 - \gamma_7} < 1.2$$

where $\gamma_5$–$\gamma_8$ represent the curvature radii of the successive surfaces of said first and second positive lenses from the object side.

4. An inverted Galilean finder according to claim 3, wherein numerical data are as follows:

TABLE

|  | $\gamma$ | d | nd | $\nu$d |
|---|---|---|---|---|
| (1) | $\infty$ | 2.50000 | 1.71300 | 54.0 |
| (2) | 25.12000 | 4.40000 |  |  |
| (3) | $\infty$ | 1.50000 | 1.51680 | 64.1 |
| (4) | 66.57700 | 14.40000 |  |  |
| (5) | 49.60000 | 2.80000 | 1.51680 | 64.1 |
| (6) | $\infty$ | .50000 |  |  |
| (7) | 49.60000 | 5.40000 | 1.51680 | 64.1 |
| (8) | $\infty$ |  |  |  |

($d_4$ is the interval when visibility = $-0.931$)
$F_1 = -35.231$
$f_2 = -128.825$
$f_3 = 95.975$
$f_4 = 95.975$
$F_1 = -26.786$
$F_2 = 48.581$
$t = 21.795$ (when visibility = 0 Diopter)
$\gamma = 0.551$ where $F_1$ and $F_2$ represent the focal lengths of said divergent objective lens and said convergent eyepiece, respectively, t represents the interval between the principal surfaces of said objective lens and said eyepiece, $\gamma$ represents the angular magnification of an afocal system constituted by $F_1$ and $F_2$, $f_1$ and $f_2$ represent the focal lengths of said first and second negative lenses, respectively, and $f_3$ and $f_4$ represent the focal lengths of said first and second positive lenses, respectively.

5. An inverted Galilean finder according to claim 3 wherein said finder includes a field frame provided on said eyepiece so as to be capable of reflecting the light beam from said objective lens, and a reflecting surface provided on said objective lens and capable of reflecting the light beam from said field frame toward said eyepiece to indicate an Albada bright frame within the finder view field, said field frame being provided on the rear surface of said first positive lens and said reflecting surface being provided on the rear surface of said second negative lens.

* * * * *

UNITED STATES PATENT AND TRADEMARK OFFICE
CERTIFICATE OF CORRECTION

PATENT NO. : 4,348,090

DATED : September 7, 1982

INVENTOR(S) : YUTAKA IIZUKA

It is certified that error appears in the above—identified patent and that said Letters Patent is hereby corrected as shown below:

On the title page
In the headnote, between item [22] and item [51], insert --[30] Foreign Application Priority Date June 3, 1980 [JP] Japan...........80-74540--.

Column 4, line 34, "$F_1$" should be --$f_1$--;
         line 53, "as" (first occurrence) should be --at--.

Column 5, line 16, after "1.7" delete "(5)".

Column 6, line 13, change "$F_1$" to --$f_1$--.

Signed and Sealed this

Fourteenth Day of December 1982

[SEAL]

Attest:

GERALD J. MOSSINGHOFF

Attesting Officer     Commissioner of Patents and Trademarks